(12) United States Patent
Tachwali

(10) Patent No.: US 12,222,424 B2
(45) Date of Patent: Feb. 11, 2025

(54) REDUCING COEXISTENCE INTERFERENCE FOR LIGHT DETECTION AND RANGING

(71) Applicant: LG INNOTEK CO., LTD., Seoul (KR)

(72) Inventor: Yahia Tachwali, Princeton, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 921 days.

(21) Appl. No.: 17/201,906

(22) Filed: Mar. 15, 2021

(65) Prior Publication Data
US 2022/0291389 A1 Sep. 15, 2022

(51) Int. Cl.
*G01S 17/00* (2020.01)
*G01S 7/487* (2006.01)
*G01S 17/931* (2020.01)

(52) U.S. Cl.
CPC ........... *G01S 17/931* (2020.01); *G01S 7/487* (2013.01)

(58) Field of Classification Search
USPC ........................................................ 356/4.04
See application file for complete search history.

(56) References Cited

U.S. PATENT DOCUMENTS

| | | | |
|---|---|---|---|
| 7,746,450 | B2 | 6/2010 | Willner et al. |
| 9,575,184 | B2* | 2/2017 | Gilliland ................ G01S 17/10 |
| 10,031,214 | B2* | 7/2018 | Rosenzweig ......... G01S 7/4812 |
| 10,545,240 | B2* | 1/2020 | Campbell ............... G01S 17/42 |
| 10,690,756 | B2 | 6/2020 | Warke et al. |
| 10,761,195 | B2* | 9/2020 | Donovan ................ G01S 7/484 |
| 10,845,470 | B2* | 11/2020 | Verghese .............. G01S 7/4868 |
| 10,852,433 | B2* | 12/2020 | Chen ..................... G01S 7/4861 |
| 11,041,944 | B2* | 6/2021 | Zhu ........................ G01S 17/26 |
| 11,092,692 | B2* | 8/2021 | Lee ..................... G01C 21/3602 |
| 11,105,925 | B2* | 8/2021 | Pacala .................... G01S 17/89 |
| 11,402,477 | B2* | 8/2022 | Zhu ........................ G01S 17/89 |
| 11,675,062 | B2* | 6/2023 | Vogt ........................ G01S 17/32 |
| | | | 356/5.01 |

(Continued)

FOREIGN PATENT DOCUMENTS

CN 111077529 A 4/2020
JP 2020201133 A 12/2020

(Continued)

OTHER PUBLICATIONS

International Search Report and Written Opinion for International Application No. PCT/US2022/020209, Korean Intellectual Property Office, Daejeon, Republic of Korea, dated Jun. 24, 2022, 9 pages.

(Continued)

*Primary Examiner* — James R Hulka
(74) *Attorney, Agent, or Firm* — Birch, Stewart, Kolasch & Birch, LLP

(57) ABSTRACT

Devices, systems, and methods are provided for reducing interference of light detection and ranging (LIDAR) emissions. A vehicle may identify location information associated with a location of the vehicle. The vehicle may select, based on the location information, a modulation code associated with a LIDAR photodiode of the vehicle. The vehicle may emit, using the LIDAR photodiode, one or more LIDAR pulses based on the modulation code.

18 Claims, 7 Drawing Sheets

(56) References Cited

U.S. PATENT DOCUMENTS

| | | |
|---|---|---|
| 2009/0059201 A1* | 3/2009 | Willner .................. G01S 17/58 |
| | | 356/5.01 |
| 2016/0003946 A1 | 1/2016 | Gilliland et al. |
| 2017/0293016 A1 | 10/2017 | McCloskey et al. |
| 2017/0307736 A1 | 10/2017 | Donovan |
| 2017/0329010 A1* | 11/2017 | Warke ..................... G01S 17/10 |
| 2018/0136321 A1 | 5/2018 | Verghese et al. |
| 2018/0136331 A1 | 5/2018 | Rosenzweig et al. |
| 2018/0239001 A1 | 8/2018 | Dussan et al. |
| 2018/0284279 A1 | 10/2018 | Campbell et al. |
| 2019/0056497 A1 | 2/2019 | Pacala et al. |
| 2019/0285749 A1 | 9/2019 | Chen |
| 2020/0225334 A1 | 7/2020 | Vogt et al. |
| 2020/0278430 A1 | 9/2020 | Zhu et al. |
| 2020/0278431 A1 | 9/2020 | Zhu et al. |
| 2020/0386895 A1 | 12/2020 | Lee et al. |
| 2021/0055734 A1 | 2/2021 | Yokev et al. |

FOREIGN PATENT DOCUMENTS

| | | |
|---|---|---|
| KR | 101817874 B1 | 1/2018 |
| WO | 2018050906 A2 | 3/2018 |
| WO | 2019149688 A1 | 8/2019 |

OTHER PUBLICATIONS

Fersch et al. "A CDMA Modulation Technique for Automotive Time-of-Flight LiDAR Systems", IEEE Sensors Journal, Mar. 27, 2017, pp. 3507-3516, vol. 17, issue 11, IEEE, New York, NY.

\* cited by examiner

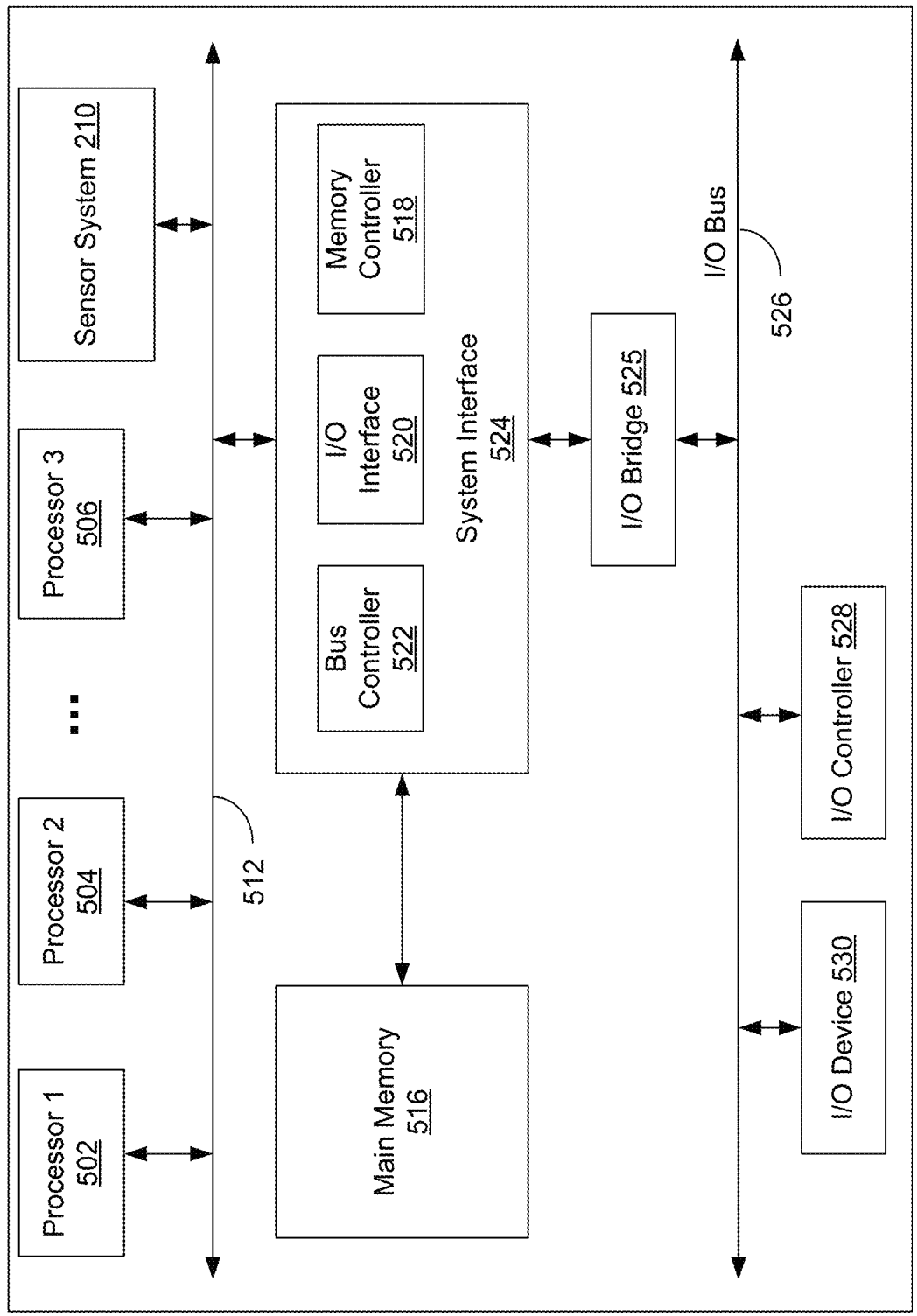

REDUCING COEXISTENCE INTERFERENCE FOR LIGHT DETECTION AND RANGING

TECHNICAL FIELD

This disclosure generally relates to systems, methods, and devices for reducing interference of light detection and ranging (LIDAR) emissions.

BACKGROUND

Some vehicles are equipped with a sensor system to collect data relating to the current and developing state of a vehicle's surroundings. The operation of a vehicle may depend on the accuracy of data collected by the sensors in the sensor system.

However, multiple proximal LIDAR devices near one another may cause interference.

BRIEF DESCRIPTION OF THE DRAWINGS

FIG. 5 is a block diagram illustrating an example of a computing device or computer system upon which any of one or more techniques (e.g., methods) may be performed, in accordance with one or more example embodiments of the present disclosure.

Figure 1A:
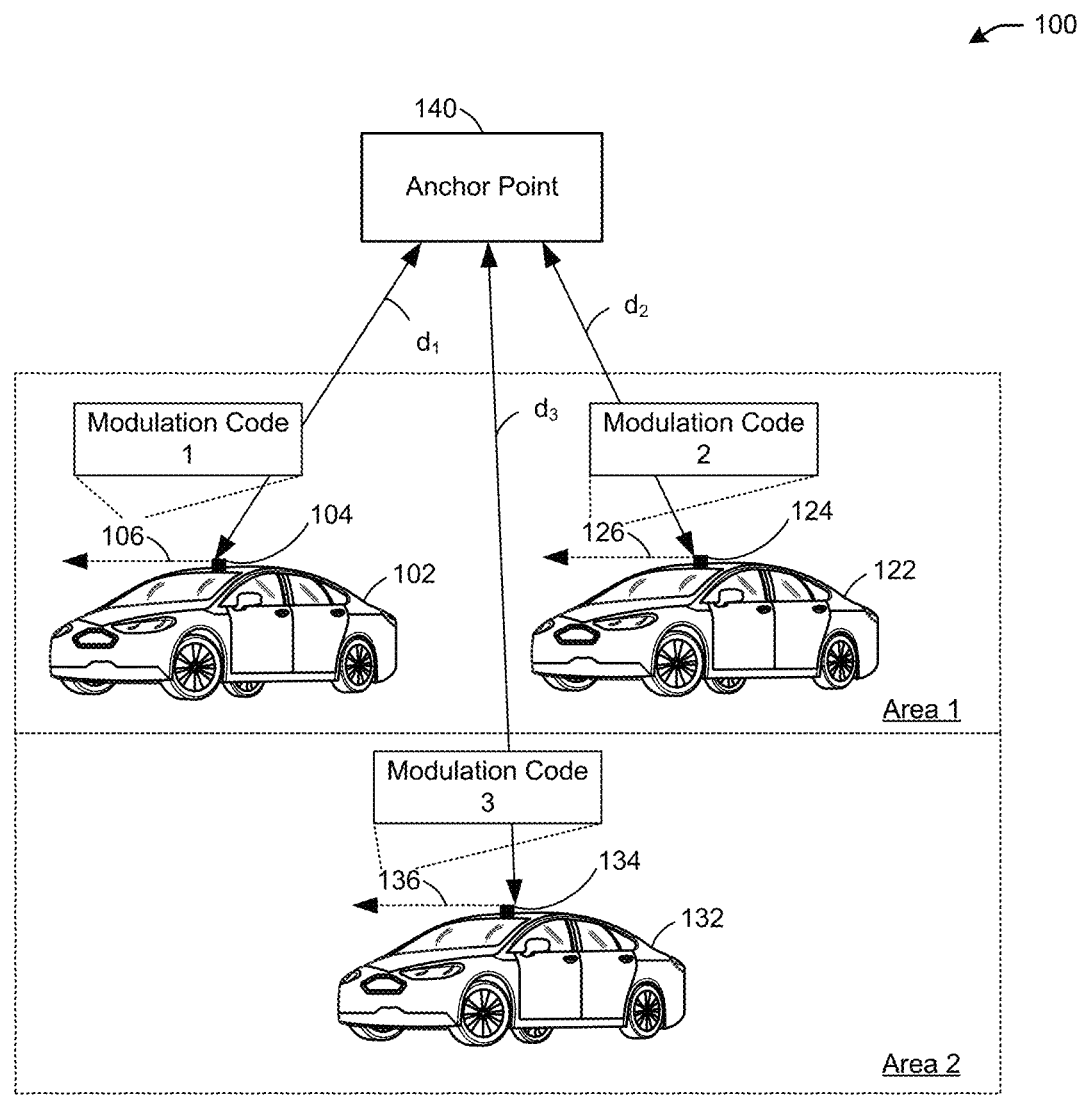
FIG. 1A illustrates example vehicle environment, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include light detection and ranging (LIDAR) sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, sensors such as LIDAR rely on accurate detection of signals reflected from objects in the vicinity of the autonomous vehicle. LIDAR transceivers may use photodiodes, such as avalanche photodiodes (APDs).

When multiple vehicles equipped with LIDAR photodiodes are operating in proximity to one another, LIDAR pulses emitted by the vehicles may interfere with one another. For example, a vehicle with a LIDAR photodiode may not be able to identify or differentiate between reflections of LIDAR pulses emitted by the LIDAR photodiode because another nearby vehicle may have emitted a LIDAR pulse at the same time, frequency, polarization, phase, etc. In particular, a vehicle with a LIDAR photodiode may not be able to distinguish between LIDAR pulses emitted by the vehicle or LIDAR pulses emitted by another vehicle.

There is therefore a need to reduce coexistence interference caused by multiple LIDAR transceivers operating in proximity to one another.

In one or more embodiments, vehicles may modulate the emissions of LIDAR pulses using photodiodes. The modulation may be based on a modulation code, such as Barker codes and the like. One example of modulation is amplitude modulation resulting in on-off pulse transmission scheme. For example, a modulation code of [1, 0, 1, 1] may indicate that a first LIDAR pulse is to be emitted using a first range gate, a second LIDAR pulse is to be emitted using a third range gate, and a third LIDAR pulse it to be emitted using a fourth range gate, where a second range gate may refrain from emitting a LIDAR pulse. To provide LIDAR pulse modulation, different vehicles and their LIDAR photodiodes may select modulation codes based on a location of a vehicle at a given time (e.g., Global Positioning System data, Global Navigation Satellite System data, etc.). Based on a vehicle's location, the vehicle may select a modulation code used to govern the emission of LIDAR pulses.

In one or more embodiments, multiple modulation codes may be available to vehicles in a given geographic area. The modulation codes may be orthogonal to one another, meaning that when they are multiplied, the sum of their values is zero. The modulation codes may be quasi-orthogonal to one another (e.g., when the codes are multiplied, the sum of their values may not need to be zero). Quasi-orthogonal codes may be used to reduce the contribution of unwanted signals. Perfectly orthogonal codes may have a contribution of zero from unwanted signals. By making multiple orthogonal modulation codes available for vehicles in a given geographic area, when vehicles select modulation codes for use, the likelihood of LIDAR pulse interference among the multiple vehicles decreases. The orthogonality of modulation codes may be in time, frequency, phase, polarization, or in amplitude.

In one or more embodiments, a modulation code may be based on a distance to an anchor point (e.g., a location of a stoplight, traffic sign, etc.). Anchor points may be predetermined and identified by geographic maps available to any autonomous vehicle. As the distance between the anchor point increases (e.g., and an increasing distance corresponds to a different geographic area), the constraint of orthogonality between the corresponding modulation codes may be relaxed. In this manner, a vehicle may use the same modulation code in one geographic area closer to the anchor point location as the vehicle may use in another geographic area further from the anchor point location. Accordingly, orthogonality may be achieved within a given geographic area by using a set of orthogonal modulation codes even when the same modulation codes are used by vehicles in a different geographic area. A modulation code may be assigned to a geographic area, and an orthogonal version of the modulation code may be assigned to adjacent geographic areas while a different modulation code may be assigned at another (e.g., further away) geographic area. For example, for a Barker code, a rotated code may be an orthogonal code or quasi-orthogonal code.

In one or more embodiments, a centralized system (e.g., a cloud-based system) may assign modulation codes to vehicle photodiodes based on vehicle locations. The centralized system may receive and store location information of the vehicles (in accordance with relevant laws and regulations, and/or with user consent), and based on the number of vehicles within a geographic area or within a threshold distance from an anchor point location, may allocate modulation codes based on time, frequency, polarization, phase, or the like. In this manner, the centralized system may assign vehicles in a geographic area different respective modulation codes orthogonal or quasi-orthogonal to one another to reduce interference from the coexisting LIDAR photodiodes in the geographic area.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1A illustrates example vehicle environment 100, in accordance with one or more example embodiments of the present disclosure.

Referring to FIG. 1A, the vehicle environment may include multiple vehicles operating in multiple geographic areas (e.g., area 1, area 2). A vehicle 102 in area 1 may include a LIDAR photodiode 104 that emits LIDAR pulses 106 used to detect the distance of objects from the vehicle 102 (e.g., as explained further with regard to FIG. 2). A vehicle 122 may be in area 1 and may include a LIDAR photodiode 124 that emits LIDAR pulses 126 used to detect the distance of objects from the vehicle 122. A vehicle 132 may be in area 2 and may include a LIDAR photodiode 134 that emits LIDAR pulses 136 used to detect the distance of objects from the vehicle 132. The vehicle 132 may represent a different vehicle than the vehicle 102, or may represent the vehicle 102 at a different time (e.g., as the vehicle 102 moves between area 1 and area 2).

Still referring to FIG. 1A, based on the vehicle locations, the LIDAR pulses emitted by the vehicles may use different modulation codes. For example, whether a vehicle is in area 1 or area 2 may result in a vehicle selection or assignment of modulation codes, or whether a vehicle's distance from an anchor point location 140 (e.g., a predetermined anchor point, such as an object location, on a map accessible to the vehicle 102 and any of the other vehicles shown) exceeds or does not exceed a threshold distance may result in a vehicle selection or assignment of modulation codes. For example, a vehicle distance from the anchor point location 140 may correspond to a geographic area. As shown, the vehicle 102 may be a distance $d_1$ from the anchor point location, the vehicle 122 may be a distance $d_2$ from the anchor point location 140, and the vehicle 132 may be a distance $d_3$ from the anchor point location 140. The distance $d_1$ and the distance $d_2$ may correspond to the geographic area 1, and the distance $d_3$ may correspond to the geographic area 3. Whether a respective vehicle distance satisfies a distance threshold from the anchor point location 140 may cause a vehicle to select or be assigned a particular modulation code (e.g., based on the geographic area to which a distance corresponds). For example, the vehicle 102 may select or be assigned modulation code 1, and the vehicle 122 may select or be assigned the modulation code 2. Because the vehicle 102 and the vehicle 122 may be in the same geographic area (e.g., area 1, or at distances $d_1$ and $d_2$, respectively, within a threshold distance from the anchor point location 140), the modulation code 1 and the modulation code 2 may be orthogonal or quasi-orthogonal from one another so that the LIDAR pulses 106 emitted by the LIDAR photodiode 104 based on the modulation code 1 and LIDAR pulses 126 emitted by the LIDAR photodiode 124 based on the modulation code 2 may be orthogonal or quasi-orthogonal from one another, limiting the chance for interference (e.g., as the LIDAR photodiode 104 may detect the LIDAR pulses 126, and the LIDAR photodiode 124 may detect the LIDAR pulses 106). Because the vehicle 132 is in a different geographic area (e.g., area 2, or a distance $d_3$ that is greater than a threshold distance from the anchor point location 140) than the vehicles 102 and 122 (e.g., and the risk of coexistence interference with the LIDAR photodiodes 104 and 124 may be lower), the modulation code 3 selected by or assigned to the vehicle 132 may not require orthogonality with the modulation code 1 and the modulation code 2 (e.g., may be the same as or at least not orthogonal with the modulation code 1 and the modulation code 2).

In one or more embodiments, the vehicles 102, 124, and 134 may not need to rely on the anchor point location 140. Instead, respective locations of the vehicles 102, 124, and 134 may correspond to a geographic area. For example, the vehicle 102 may determine its GPS location (e.g., coordinates), and the GPS location may map to a geographic area. Based on the geographic area in which the vehicle 102 is located at a given time, the vehicle 102 may select or be assigned a modulation code (e.g., the modulation code 1) for facilitating LIDAR pulse emissions.

In one or more embodiments, the modulation of the LIDAR pulses 106, 126, and 136 may be based on the modulation codes 1-3, respectively, which may use Barker codes and the like. One example of modulation is amplitude modulation resulting in on-off pulse transmission scheme. For example, a modulation code of [1, 0, 1, 1] may indicate that a first LIDAR pulse is to be emitted using a first range gate, a second LIDAR pulse is to be emitted using a third range gate, and a third LIDAR pulse it to be emitted using a fourth range gate, where a second range gate may refrain from emitting a LIDAR pulse. For example, the LIDAR photodiodes 104, 124, and 134 may include multiple range gates that allow or do not allow LIDAR pulses to pass and be emitted at given times. To provide LIDAR pulse modulation, any of the vehicles 102, 122, and 132, and their LIDAR photodiodes may select modulation codes based on a location of the respective vehicle at a given time (e.g., Global Positioning System data, Global Navigation Satellite System data, etc.). Based on a vehicle's location, the vehicle may select a modulation code used to govern the emission of the LIDAR pulses.

In one or more embodiments, multiple modulation codes may be available to vehicles in a given geographic area. For example, the modulation code 1 and the modulation code 2 may be selected or assigned from among multiple available modulation codes for vehicles in area 1 or within a threshold distance of the anchor point location 140. The modulation codes may be orthogonal to one another, meaning that when they are multiplied, the sum of their values is zero, ideally, (e.g., a modulation code [1, −1, −1, 1] is orthogonal to a modulation code [1,−1, 1,−1], and orthogonal code [1,0,1,0] is orthogonal to modulation code [0,1,0,1]). By making multiple orthogonal modulation codes available for vehicles in a given geographic area, when vehicles select modulation codes for use, the likelihood of LIDAR pulse interference among the multiple vehicles decreases. In one or more embodiments, the orthogonality or quasi-orthogonality of modulation codes may be in time or in amplitude (e.g., [1,0,1,0] and [0,1,0,1] may refer to pulse emission times, pulse coding (e.g., offsets/delays with a same range gate), or amplitudes). For example, the modulation codes may represent offsets of LIDAR pulses, and the offsets may be used to disambiguate LIDAR reflections. The modulation codes may be quasi-orthogonal. Pulse coding may mitigate out-of-range interference. When a modulation code is decoded using a rotated version of the modulation code, the associated detection times may be spread out in histogram. For example, with a modulation code of x=[1, 7, 12, 16, 19, 21, 22, 21, 19, 16, 12, 7] and a rotated version x_rotated=[7, 12, 16, 19, 21, 22, 21, 19, 16, 12, 7, 1], x−x_rotated results in [−6, 6, 5, 4, 3, 2, 1, −1,−2, −3, −4, −5], so associated detection events may not "stack up" in a histogram, but instead may spread out from a bin at detection location −6 to a detection location 6. For example, the modulation codes may represent offsets of LIDAR pulses, and the offsets may be used to disambiguate LIDAR reflections. The modulation codes may be quasi-orthogonal. Pulse coding may mitigate out-of-range interference by modulating the time offset of transmitting the pulse. The demodulation process removes those offsets by subtracting the introduced offsets from the time stamp of received pulse in the same order those offsets are applied to the transmitted pulse. An interfering pulse sequence may not have the same sequence of offsets applied to it. In some case, it can be a rotated version of these offsets. When a modulation code is decoded using a rotated version of the modulation code, the associated detection times may be spread out in histogram. For example, with a modulation code of x=[1, 7, 12, 16, 19, 21, 22, 21, 19, 16, 12, 7] and an interfering pulse sequence will have a rotated version x_rotated=[7, 12, 16, 19, 21, 22, 21, 19, 16, 12, 7, 1], then when the received pulses are decoded using a rotated version of the applied offsets x−x_rotated results in [−6, 6, 5, 4, 3, 2, 1, −1,−2, −3, −4, −5], so associated detection events may not "stack up" in a histogram, but instead may spread out from a bin at detection location −6 to a detection location 6.

In one or more embodiments, a modulation code may be based on a distance to the anchor point location 140. As the distance from the anchor point location 140 increases, the constraint of orthogonality between the corresponding modulation codes may be relaxed. In this manner, the vehicle 102 may use the same modulation code 1 in the area 1 closer to the anchor point location 140 as the vehicle 132 may use in the area 2 further from the anchor point location 140. Accordingly, orthogonality may be achieved within a given geographic area by using a set of orthogonal modulation codes even when the same modulation codes are used by vehicles in a different geographic area. A modulation code may be assigned to a geographic area, and an orthogonal version of the modulation code may be assigned to adjacent geographic areas while a different modulation code may be assigned at another (e.g., further away) geographic area. The modulation codes may be selected by the vehicles, or may be assigned to the vehicles (e.g., as explained further with regard to FIG. 3).

Figure 2:
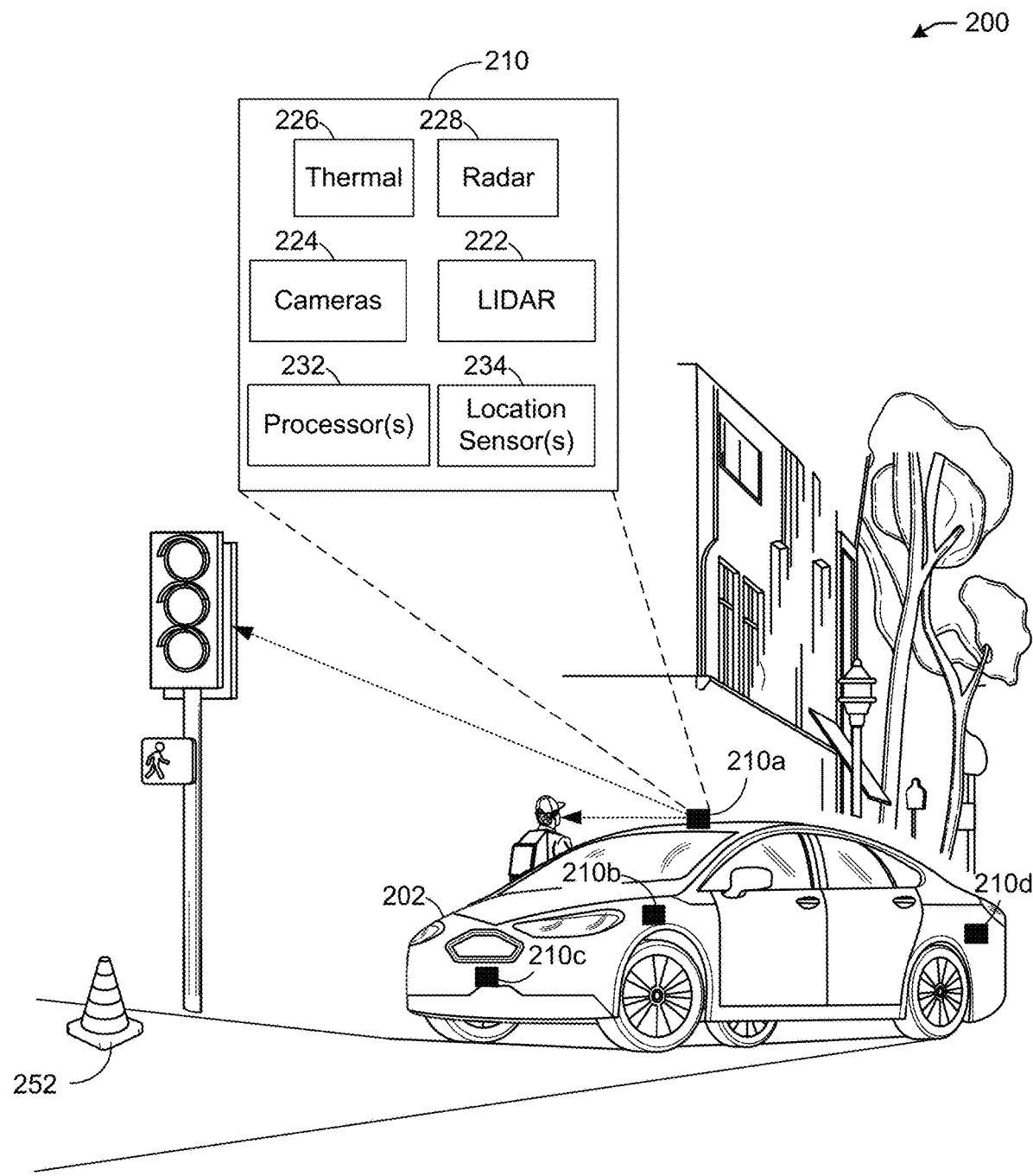
FIG. 2 illustrates an example vehicle system, in accordance with one or more example embodiments of the present disclosure.

In one or more embodiments, the vehicles 102, 122, and 132 may be autonomous vehicles whose operations are at least partially reliant on LIDAR data (e.g., as described further with regard to FIG. 2). Accordingly, a reduction of interference in emitted LIDAR pulses may result in enhanced operation of the vehicles (e.g., speed, direction, etc. based on the detection of objects).

It is understood that the above descriptions are for purposes of illustration and are not meant to be limiting.

Figure 1B:
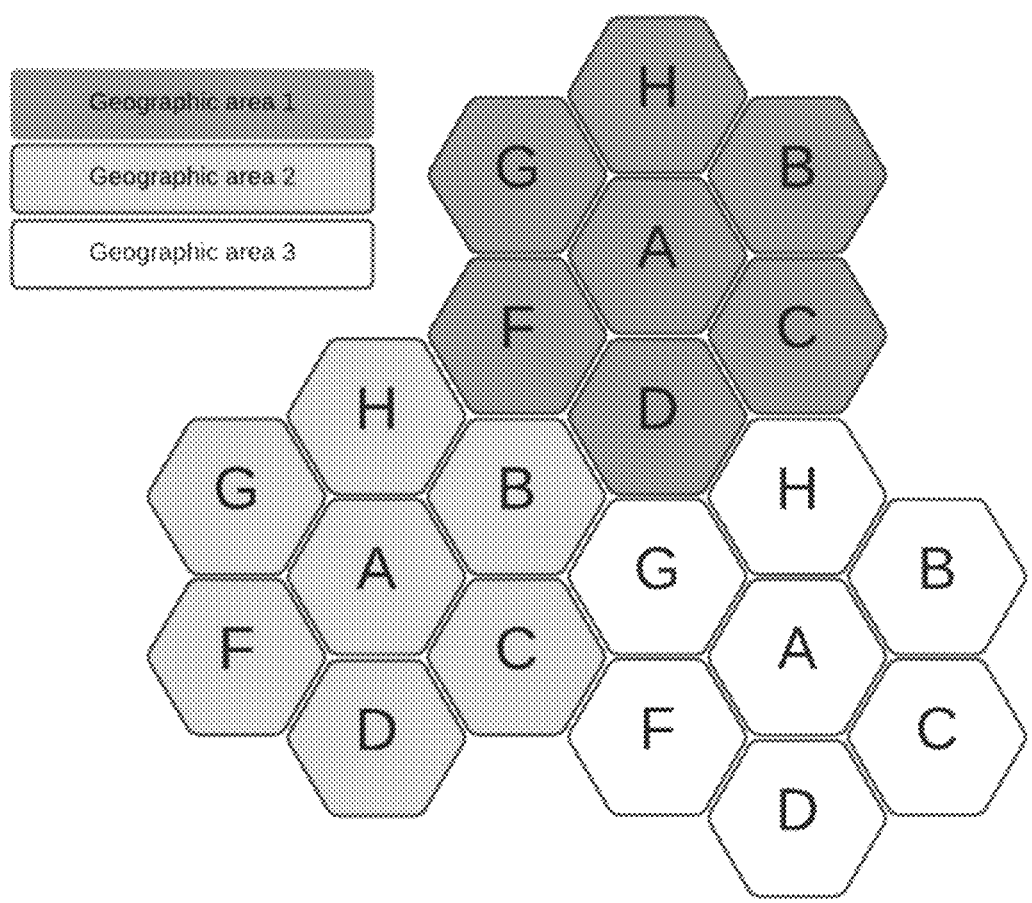
FIG. 1B illustrates example geographic areas of the example vehicle environment of FIG. 1A, in accordance with one or more example embodiments of the present disclosure.

FIG. 1B illustrates example geographic areas of the example vehicle environment of FIG. 1A, in accordance with one or more example embodiments of the present disclosure.

Referring to FIG. 1B, the geographic areas 1-3 of FIG. 1A are shown with different (e.g., orthogonal or quasi-orthogonal) modulation codes A-H. As shown, any of the modulation codes A-H may be reused in multiple areas (e.g., modulation codes A-H may be used in any or the geographic areas 1-3). However, because vehicles (e.g., the vehicles 102, 122, and/or 132 of FIG. 1) may be proximal to one another when located at the boundaries that separate the geographic areas 1-3, the modulation code scheme may reduce interference by avoiding reuse of a same modulation code in two adjacent portions of two different geographic areas (e.g., the modulation code D may be used by a vehicle in a portion of the geographic area 2, but the adjacent portion of the geographic area 1 may use modulation code B, and the adjacent portions of the geographic area 3 may use modulation codes G and H as shown).

FIG. 2 illustrates an example vehicle system 200, in accordance with one or more example embodiments of the present disclosure.

Referring to FIG. 2, there is shown a vehicle 202 (e.g., similar to the vehicles 102, 122, and 132 of FIG. 1A) having a sensor system 210 for a plurality of cameras, emitters, and sensors (e.g., transceivers). The sensor system 210 may be connected to the vehicle 202. In the system 200, there is shown that sensor system 210 includes sensors such as sensors 210*a*, 210*b*, 210*c*, and 210*d*. It should be noted that other sensors not shown in this figure may also be attached to the vehicle 202 and that the sensors 210*a*, 210*b*, 210*c*, and 210*d* are used for illustrative purposes. These sensors may detect objects (e.g., object 252) in the vicinity and around the vehicle 202. Other emitters and sensors in the sensor system 210 may transmit and/or receive one or more signals in order to detect and/or capture information associated with objects in the vicinity and around the vehicle 202. For example, a LIDAR sensor (e.g., similar to the LIDAR photodiodes 104, 124, and 134 of FIG. 1) may emit a LIDAR signal (e.g., light or an electromagnetic wave similar to the LIDAR pulses 106, 126, and 136 of FIG. 1A), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 210 may include LIDAR 222 (e.g., LIDAR emitters and sensors/receivers, such as the LIDAR photodiodes 104, 124, and 134 of FIG. 1A). Some examples of a LIDAR may include Geiger mode LIDAR, line-mode LIDAR, large footprint LIDAR, small footprint LIDAR, or the like. The sensor system 210 may include cameras 224 such as stereo cameras that may capture images in the vicinity of the vehicle 202. The sensor system 210 may include a thermal sensor 226, such as thermistors, resistance temperature detectors, thermocouples, semiconductors, or the like. Further, the sensor system may include a radar 228, which may be any radar that uses radio waves to capture data from objects surrounding the vehicle 202. The sensor system 210 may also include one or more processors 232 and one or more location sensors 234 (e.g. Global Positioning System sensors, Global Navigation Satellite System sensors, etc.). The one or more processors 232 may control the transmission/emission and reception/detection of signals using the LIDAR 222, the cameras 224, the thermal sensor 226, and the radar 228. The various sensors of the sensor system 210, when calibrated correctly, should indicate a proper distance and shape of object 252.

In one or more embodiments, the sensor system 210 may emit multiple LIDAR pulses (e.g., the LIDAR pulses 106, 126, and 136 emitted according to the modulation codes 1-3 of FIG. 1). The reflection of the pulses may result in return signals that may be used by the sensor system 210 to detect an object distance (e.g., the reflection of the pulses caused by the object), for example, using the time-of-flight of an emitted LIDAR pulse and the corresponding return signal.

In one or more embodiments, to provide LIDAR pulse modulation, the sensor system 210 may select modulation codes based on a location of the vehicle 202 at a given time (e.g., Global Positioning System data, Global Navigation Satellite System data, etc.). Based on the vehicle's location (e.g., detected based on the one or more location sensors 234), the vehicle 202 may select a modulation code used to govern the emission of the LIDAR pulses. For example, when the sensor system 210 determines that the vehicle 202 is in the area 1 of FIG. 1A, the sensor system 210 may select modulation code 1 or modulation code 2 of FIG. 1A from among multiple modulation codes orthogonal to one another. The orthogonality of modulation codes may be in time or in amplitude (e.g., [1,0,1,0] and [0,1,0,1] may refer to pulse emission times or amplitudes). The sensor system 210 may have access to the modulation codes as explained further with regard to FIG. 3.

It is understood that the above descriptions are for purposes of illustration and are not meant to be limiting.

Figure 3:
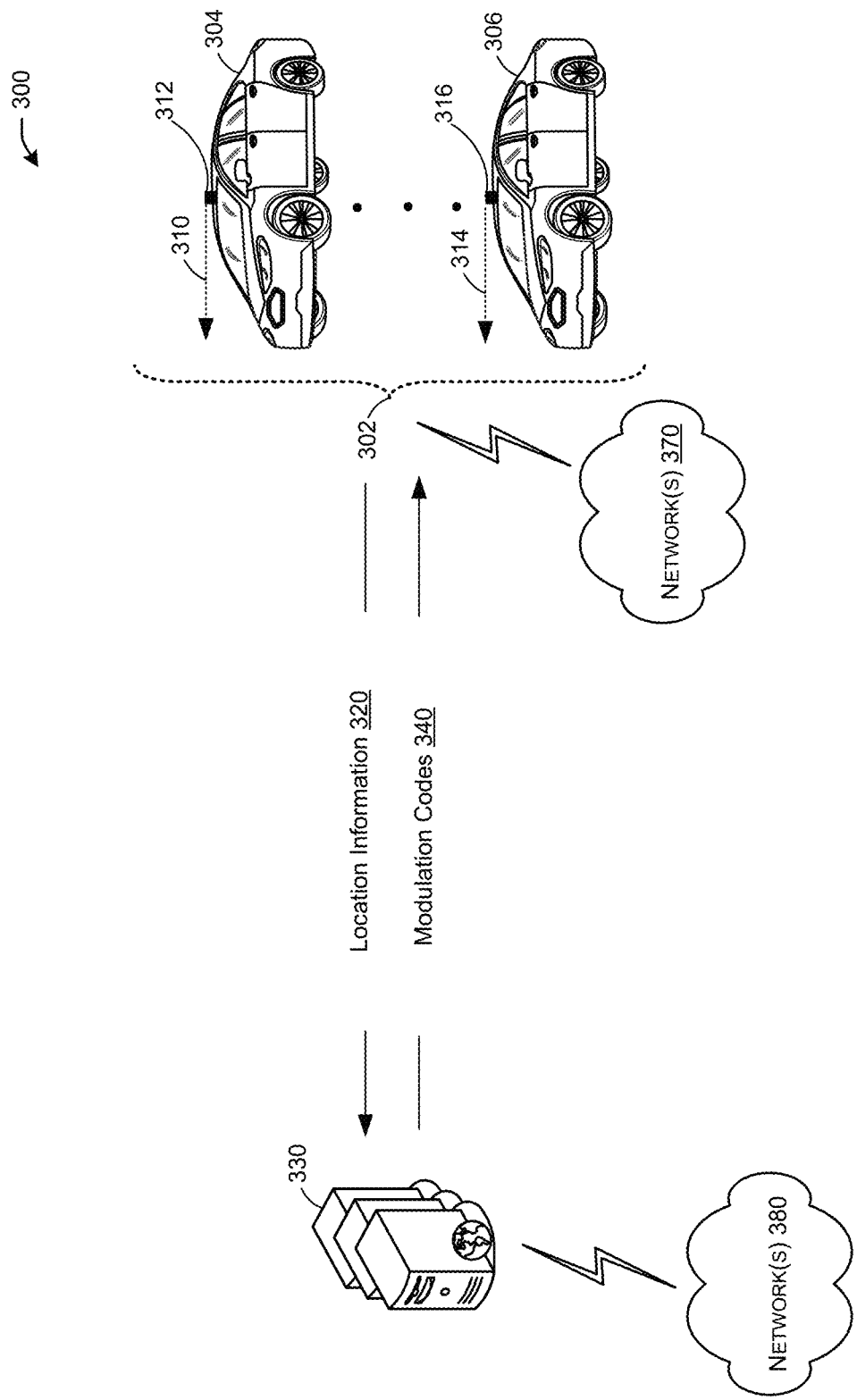
FIG. 3 illustrates an example vehicle fleet management system, in accordance with one or more example embodiments of the present disclosure.

FIG. 3 illustrates an example vehicle fleet management system 300, in accordance with one or more example embodiments of the present disclosure.

Referring to FIG. 3, vehicles 302 (e.g., vehicle 304, vehicle 306, similar to the vehicles 102, 122, and 132 of FIG. 1A and to the vehicle 202 of FIG. 2) may emit LIDAR pulses based on their respective geographic locations. For example, the vehicle 304 may emit LIDAR pulses 310 using a photodiode 312, and the vehicle 306 may emit LIDAR pulses 314 using a photodiode 316. Depending on the location of the vehicles 302, the LIDAR pulses 310 and 314 may result in interference due to the LIDAR photodiodes 312 and 316 being in proximity to one another (e.g., both being in area 1 or area 2 of FIG. 1A or within a distance threshold of the anchor point location 140 of FIG. 1A). To reduce coexistence interference, the LIDAR pulses 310 and 314 may be emitted based on respective modulation codes that may be orthogonal to one another in time and/or amplitude.

Still referring to FIG. 3, the vehicles 302 may be autonomous vehicles, and may provide location information 320 (e.g., based on the one or more location sensors 234 of FIG. 2) to a centralized system 330 (e.g., a server, cloud-based system, etc.) with user consent and consistent with relevant laws. The location information 320 may indicate respective locations of the vehicles 302 at any particular time. The centralized system 330 may use the location information to determine which modulation codes to assign to the vehicles 302 for LIDAR pulse emission, and may send the assigned modulation codes 340 to the vehicles 302. Alternatively, the vehicles 302 may have access to the modulation codes 340 (e.g., as stored modulation codes) and may select modulation codes to use for LIDAR pulse emission based on their respective locations.

In one or more embodiments, the vehicles 302 may modulate the emissions of the LIDAR pulses 310 and 314. The modulation may be based on the modulation codes 340, such as Barker codes and the like. One example of modulation is amplitude modulation resulting in on-off pulse transmission scheme. For example, a modulation code of [1, 0, 1, 1] may indicate that a first LIDAR pulse is to be emitted using a first range gate, a second LIDAR pulse is to be emitted using a third range gate, and a third LIDAR pulse it to be emitted using a fourth range gate, where a second range gate may refrain from emitting a LIDAR pulse. To provide LIDAR pulse modulation, the vehicles 302 may select modulation codes based on the location information 320 at a given time (e.g., Global Positioning System data, Global Navigation Satellite System data, etc.). Based on a vehicle's location, the vehicle may select a modulation code used to govern the emission of LIDAR pulses.

In one or more embodiments, multiple modulation codes may be available to the vehicles 302 in a given geographic area. The modulation codes 340 may be orthogonal to one another, meaning that when they are multiplied, the sum of their values is zero. By making multiple orthogonal modulation codes available for vehicles in a given geographic area, when the vehicles 302 select modulation codes for use, the likelihood of LIDAR pulse interference among the multiple vehicles decreases. The orthogonality of modulation codes may be in time or in amplitude, frequency, phase, or polarization.

In one or more embodiments, a modulation code may be based on a distance to an anchor point location (e.g., the anchor point location 140 of FIG. 1A). As the distance from the anchor point increases, the constraint of orthogonality between the corresponding modulation codes may be relaxed. In this manner, a vehicle may use the same modulation code in one geographic area closer to the anchor point location as the vehicle may use in another geographic area further from the anchor point location. Accordingly, orthogonality may be achieved within a given geographic area by using a set of orthogonal modulation codes even when the same modulation codes are used by vehicles in a different geographic area. A modulation code may be assigned to a geographic area, and an orthogonal version of the modulation code may be assigned to adjacent geographic areas while a different modulation code may be assigned at another (e.g., further away) geographic area.

In one or more embodiments, the centralized system 330 may assign the modulation codes 340 302 to the vehicles photodiodes based on vehicle locations. The centralized system 330 may receive and store the location information 320 of the vehicles (in accordance with relevant laws and regulations, and/or with user consent), and based on the number of vehicles within a geographic area or within a threshold distance from an anchor point location, may allocate modulation codes based on time, frequency, polarization, phase, or the like. In this manner, the centralized system 330 may assign vehicles in a geographic area different respective modulation codes orthogonal to one another to reduce interference from the coexisting LIDAR photodiodes in the geographic area. When the centralized system 330 determines, based on the location information 320, that a number of vehicles within a geographic area is less than a threshold number of vehicles, the modulation codes 340 provided to the vehicles 302 may have strong orthogonality, and when the number of vehicles within a geographic area exceeds a threshold number of vehicles, the modulation codes 340 provided to the vehicles 302 may have weaker orthogonality. The further the distance from the anchor point location, the less orthogonal the modulation codes 340 may need to be.

In one or more embodiments, the vehicles 302 may be assigned modulation codes in a centralized manner (e.g., using the centralized system 330) or in a decentralized manner (e.g., using the processing of the vehicles 302). The modulation code assignment may be based on geographic location of a vehicle. A map may be divided into geographic areas (e.g., FIG. 1A) with associated sets of orthogonal and/or quasi-orthogonal modulation codes. The determination of a vehicle's location may be based on GPS coordinates or proximity to an anchor point (e.g., a known location) using vehicle sensors (e.g., the LIDAR 222 of FIG. 2). To avoid vehicles at the borders of geographic areas interfering with one another (e.g., when the vehicle 104 and the vehicle 134 are near the border of geographic areas 1 and 2 of FIG. 1A), the modulation codes may be assigned or selected so that the two nearby vehicles do not use the same modulation codes.

The vehicles 302 may communicate using one or more communication networks 370, and the centralized system 330 may communicate using one or more communication networks 380. The one or more communication networks 370 and 380 may use any combination of wired or wireless networks, such as cellular networks, Wi-Fi networks, LTE, and the like.

It is understood that the above descriptions are for purposes of illustration and are not meant to be limiting.

Figure 4A:
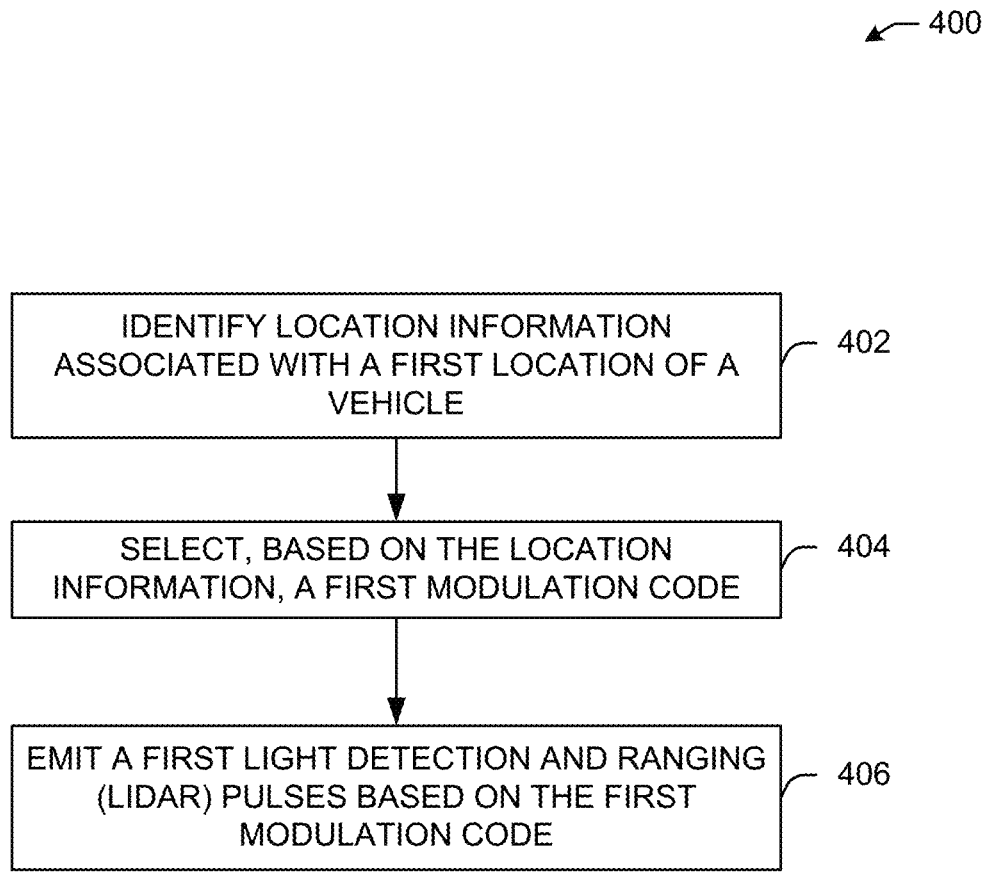
FIG. 4A illustrates a flow diagram of a distributed process for reducing coexistence interference for light detection and ranging (LIDAR), in accordance with one or more example embodiments of the present disclosure.

FIG. 4A illustrates a flow diagram of a distributed process 400 for reducing coexistence interference for light detection and ranging (LIDAR), in accordance with one or more example embodiments of the present disclosure.

At block 402, a vehicle (or device, e.g., the vehicle 102, 122, or 132 of FIG. 1A, the vehicle 202 of FIG. 2, the vehicles 302 of FIG. 3) may identify location information (e.g., the location information 320 of FIG. 3) associated with a first location of the vehicle. For example, the vehicle may include the one or more location sensors 234 of FIG. 2 to determine whether the vehicle is within a geographic area (e.g., areas 1 and 2 of FIG. 1A) or within a distance threshold from an anchor point location (e.g., whether the distance $d_1$ of FIG. 1A is above or below a threshold distance from the anchor point location 140 of FIG. 1A). The location information may be used by the vehicle or a centralized system (e.g., the centralized system 330 of FIG. 3) to determine which modulation codes to use to modulate the vehicle's emissions of LIDAR pulses to reduce coexistence interference with respect to other LIDAR pulse emissions from other nearby vehicles.

At block 404, the vehicle may select, based on the location information, a first modulation code. The modulation of LIDAR pulses emitted by the vehicle may be based on a modulation code, such as Barker codes and the like. One example of modulation is amplitude modulation resulting in on-off pulse transmission scheme. To provide LIDAR pulse modulation, different the vehicle or a centralized system may select modulation codes based on a location of the vehicle at a given time. Based on the vehicle's location, the vehicle may select a modulation code used to govern the emission of LIDAR pulses. For example, multiple modulation codes may be available to vehicles in a given geographic area. The modulation codes may be orthogonal or quasi-orthogonal to one another. By making multiple orthogonal modulation codes available for vehicles in a given geographic area, when vehicles select modulation codes for use, the likelihood of LIDAR pulse interference among the multiple vehicles decreases. The orthogonality of modulation codes may be in time or in amplitude, frequency, or polarization. The selection of a modulation code may be based on a distance of the vehicle to an anchor point location. As the distance between the anchor point increases, the constraint of orthogonality between the corresponding modulation codes may be relaxed. In this manner, the vehicle may use the same modulation code in one geographic area closer to the anchor point location as the vehicle may use in another geographic area further from the anchor point location (e.g., at different times and locations of the vehicle). In one or more embodiments, a centralized system (e.g., the centralized system 330 of FIG. 3) may assign modulation codes to the vehicle based on the vehicle's location. The centralized system may receive and store location information of the vehicles (in accordance with relevant laws and regulations, and/or with user consent), and based on the number of vehicles within a geographic area or within a threshold distance from an anchor point location, may allocate modulation codes based on time, frequency, phase, polarization, or the like. In this manner, the centralized system may assign vehicles in a geographic area different respective modulation codes orthogonal to one another to reduce interference from the coexisting LIDAR photodiodes in the geographic area.

At block 406, the vehicle may, using one or more LIDAR photodiodes (e.g., the photodiodes 104, 124, or 134 of FIG. 1A, the LIDAR 222 of FIG. 2) emit LIDAR pulses (e.g., the LIDAR pulses 106, 126, or 136 of FIG. 1A) based on the selected modulation code. For example, a modulation code of [1, 0, 1, 1] may indicate that a first LIDAR pulse is to be emitted using a first range gate, a second LIDAR pulse is to be emitted using a third range gate, and a third LIDAR pulse it to be emitted using a fourth range gate, where a second range gate may refrain from emitting a LIDAR pulse. The vehicle may use the range gates to regulate when LIDAR pulses are emitted and at what amplitude. For the first modulation code of [1, 0, 1, 1], the is may refer to times and/or amplitude values. In this manner, when multiple nearby vehicles emit LIDAR pulses at times and/or amplitudes using orthogonal modulation codes, the modulated LIDAR pulse emissions may result in less coexistence interference as vehicle photodiodes detect LIDAR pulse reflections.

Figure 4B:
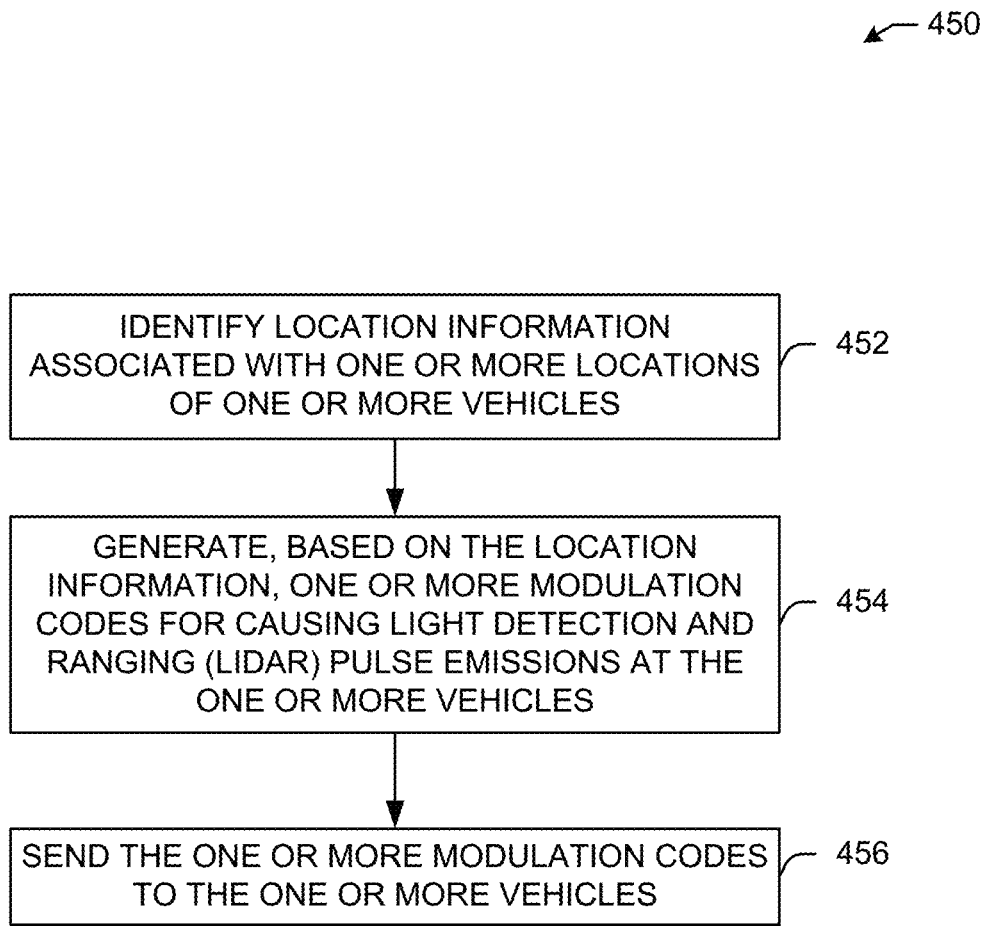
FIG. 4B illustrates a flow diagram of a centralized process for reducing coexistence interference for LIDAR, in accordance with one or more example embodiments of the present disclosure.

FIG. 4B illustrates a flow diagram of a centralized process 450 for reducing coexistence interference for light detection and ranging (LIDAR), in accordance with one or more example embodiments of the present disclosure.

At block 452, a device (or system, e.g., the centralized system 330 of FIG. 3, such as a fleet management system) may identify location information associated with respective locations of one or more vehicles (e.g., the location information 320 of FIG. 3). The location information may be received from the vehicles or another device that collects vehicle location information. The location information may include Global Positioning System (GPS) data, Global Navigation Satellite System (GNSS) data, or the like as provided based on the locations detected by the vehicles or other devices (e.g., smart phones, traffic light systems, etc.). The locations may indicate specific geographic coordinates, and/ or may be used to determine a distance to an anchor point location (e.g., the anchor point location 140 of FIG. 1A) or whether a vehicle is within a geographic area of multiple geographic areas (e.g., areas 1 and 2 of FIG. 1A). For example, when the location data includes geographic coordinates, the device may determine whether the coordinates correspond to a distance that is above below a threshold distance from an anchor point location, or whether the coordinates correspond to a particular geographic location. When the location data is indicative of a distance (e.g., based on a signal strength of data sent between a vehicle or device within the vehicle and another device, such as an access point or cellular tower, image-based detection of a vehicle at a location such as a traffic light, etc.), the device may determine the distance from an anchor point location and whether the distance is above or below the threshold distance from the anchor point location. The distance from the anchor point location may correspond to a geographic area in which the vehicle is located.

At block 454, the device may generate modulation codes for respective vehicles and times. The modulation of LIDAR pulses emitted by the vehicle may be based on a modulation code, such as Barker codes and the like. One example of modulation is amplitude modulation resulting in on-off pulse transmission scheme. To provide LIDAR pulse modulation, different the vehicle or a centralized system may select modulation codes based on a location of the vehicle at a given time. Based on a vehicle's location, the device may select a modulation code used to govern the emission of LIDAR pulses of the vehicle. For example, multiple modulation codes may be available to vehicles in a given geographic area. The modulation codes may be orthogonal or quasi-orthogonal to one another. By making multiple orthogonal modulation codes available for vehicles in a given geographic area, when the device generates modulation codes for use, the likelihood of LIDAR pulse interference among the multiple vehicles decreases. The orthogonality of modulation codes may be in time or in amplitude. The selection of a modulation code may be based on a distance of a vehicle to an anchor point location. As the distance between the anchor point increases, the constraint of orthogonality between the corresponding modulation codes may be relaxed. In this manner, a vehicle may use the same modulation code in one geographic area closer to the anchor point location as the vehicle may use in another geographic area further from the anchor point location (e.g., at different times and locations of the vehicle). In one or more embodiments, the device may assign modulation codes to vehicles based on the vehicles locations and whether the number of vehicles in a geographic area is above or below a threshold number of vehicles. The device may receive and store location information of the vehicles (in accordance with relevant laws and regulations, and/or with user consent), and based on the number of vehicles within a geographic area or within a threshold distance from an anchor point location, may allocate modulation codes based on time, frequency, phase, polarization, or the like. In this manner, the device may assign vehicles in a geographic area different respective modulation codes orthogonal to one another to reduce interference from the coexisting LIDAR photodiodes in the geographic area.

At block 456, the device may send the modulation codes to the vehicles for the vehicles to identify and select for use (e.g., an assignment of the modulation codes). The device may send the modulation codes in separate transmissions (e.g., unicast transmissions), or may indicate the modulation codes in a transmission addressed to multiple vehicles (e.g., multicast transmissions). The device may provide vehicle identifiers or other information to allow receiving vehicles to identify modulation code assignments.

It is understood that the above descriptions are for purposes of illustration and are not meant to be limiting.

FIG. 5 is a block diagram illustrating an example of a computing device or computer system 500 upon which any of one or more techniques (e.g., methods) may be performed, in accordance with one or more example embodiments of the present disclosure.

For example, the computing system 500 of FIG. 4 may include or represent the sensor system 210 of FIG. 2, and therefore may facilitate the emission, reception, and processing of pulses. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512. The sensor system 210 of FIG. 2 may also be in communication with the Processors 502-506 and may be connected to the processor bus 512.

Processor bus 512, also known as the host bus or the front side bus, may be used to couple the processors 502-506 and/or the sensor system 210 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506 and/or the sensor system 210. Another type of user input device includes cursor control, such as a mouse, a trackball, or cursor direction keys for communicating direction information and command selections to the processors 502-506 and/or the sensor system 210 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the sensor system 210. Main memory 516 also may be used for storing temporary variables or other intermediate information during execution of instructions by the processors 502-506 and/or the sensor system 210. System 500 may include read-only memory (ROM) and/or other static storage device coupled to the processor bus 512 for storing static information and instructions for the processors 502-506 and/or the sensor system 210. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the sensor system 210 to perform the process steps described herein. In alternative embodiments, circuitry may be used in place of or in combination with the software instructions. Thus, embodiments of the present disclosure may include both hardware and software components.

According to one embodiment, the processors 502-506 may include tensor processing units (TPUs) and/or other artificial intelligence accelerator application-specific integrated circuits (ASICs) that may allow for neural networking and other machine learning used to operate a vehicle (e.g., the vehicle 202 of FIG. 2).

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for pulse modulation, the method comprising:
identifying, by at least one processor of a vehicle, first location information associated with a first location of the vehicle and second location information associated with a second location of the vehicle;
selecting, by the at least one processor, based on the first location information, a first modulation code associated with a light detection and ranging (LIDAR) photodiode of the vehicle and a second modulation code for the LIDAR photodiode based on the second location information; and
emitting, by the LIDAR photodiode, one or more LIDAR pulses based on the first modulation code or the second modulation code,
wherein the first modulation code is orthogonal or quasi-orthogonal to the second modulation code.

2. The method of claim 1, further comprising:
identifying that the first location of the vehicle is within a first geographic area of multiple geographic areas,
wherein selecting the first modulation code is further based on the first geographic area.

3. The method of claim 2, further comprising:
identifying a distance between the first location and a third location associated with an object,
wherein identifying that the first location of the vehicle is within the first geographic area is based on the distance.

4. The method of claim 1,
wherein the first modulation code is orthogonal to the second modulation code in time, frequency, amplitude, or polarization.

5. The method of claim 1, wherein the first modulation code is based on pulse coding, and wherein the first modulation code is decoded using a modulation code that is a rotated version of the first modulation code.

6. The method of claim 1, wherein the first location information comprises Global Positioning System data.

7. The method of claim 1, further comprising:
identifying a LIDAR pulse detected by the LIDAR photodiode; and
identifying, based on the first modulation code and the second modulation code, that the LIDAR pulse is based on the one or more LIDAR pulses.

8. The method of claim 1, further comprising:
identifying a LIDAR pulse detected by the LIDAR photodiode; and
identifying, based on the first modulation code and the second modulation code, that the LIDAR pulse is not based on the one or more LIDAR pulses.

9. The method of claim 1, further comprising:
receiving, from a device, an assignment of the first modulation code, the assignment comprising a third modulation code assigned to a second vehicle,
wherein selecting the first modulation code is based on the assignment.

10. A device for pulse modulation, the device comprising memory coupled to at least one processor, the at least one processor configured to:
identify first location information associated with a first location of a vehicle and second location information associated with a second location of the vehicle, the vehicle comprising the device;
select, based on the first location information, a first modulation code associated with a light detection and ranging (LIDAR) photodiode of the vehicle and a second modulation code for the LIDAR photodiode based on the second location information; and
cause the LIDAR photodiode to emit one or more LIDAR pulses based on the first modulation code or the second modulation code,
wherein the first modulation code is orthogonal or quasi-orthogonal to the second modulation code.

11. The device of claim 10, wherein the at least one processor is further configured to:
identify that the first location of the vehicle is within a first geographic area of multiple geographic areas,
wherein to select the first modulation code is further based on the first geographic area.

12. The device of claim 11, wherein the at least one processor is further configured to:
identify, based on the first location information, a distance between the first location and a third location associated with an object,
wherein to identify that the first location of the vehicle is within the first geographic area is based on the distance.

13. The device of claim 10,
wherein the first modulation code is orthogonal to the second modulation code in time, frequency, amplitude, or polarization.

14. The device of claim 10, wherein the at least one processor is further configured to:
receive, from a second device, an assignment of the first modulation code,
wherein to select the first modulation code is based on the assignment.

15. A system for pulse modulation, the system comprising:
memory coupled to at least one processor, the at least one processor configured to:
identify first location information associated with a first location of a vehicle and second location information associated with a second location of the vehicle, the vehicle comprising the memory coupled to the at least one processor; and
select, based on the first location information or the second location information, a first modulation code associated with light detection and ranging (LIDAR) pulses and a second modulation code for the LIDAR photodiode based on the second location information; and
a LIDAR photodiode configured to:
emit one or more LIDAR pulses based on the first modulation code or the second modulation code,
wherein the first modulation code is orthogonal or quasi-orthogonal to the second modulation code.

16. The system of claim 15, wherein the at least one processor is further configured to:
identify that the first location of the vehicle is within a first geographic area of multiple geographic areas,
wherein to select the first modulation code is based on the first geographic area.

17. The system of claim 16, wherein the at least one processor is further configured to:
identify, based on the first location information, a distance between the first location and third location associated with an object,
wherein to identify that the vehicle is within the first geographic area is based on the distance.

18. The system of claim 15, wherein the at least one processor is further configured to:

receive, from a device, an assignment of the first modulation code, the assignment comprising a third modulation code assigned to a second vehicle,
wherein to select the first modulation code is based on the assignment.

\* \* \* \* \*